United States Patent
Kobayashi

(10) Patent No.: US 9,967,435 B2
(45) Date of Patent: May 8, 2018

(54) IMAGE PROCESSING APPARATUS, IMAGE PROCESSING METHOD, AND IMAGE PROCESSING PROGRAM THEREFORE

(71) Applicant: CANON KABUSHIKI KAISHA, Tokyo (JP)

(72) Inventor: Masato Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/469,183

(22) Filed: Mar. 24, 2017

(65) Prior Publication Data

US 2017/0280023 A1 Sep. 28, 2017

(30) Foreign Application Priority Data

Mar. 28, 2016 (JP) .................................. 2016-064702

(51) Int. Cl.
| | |
|---|---|
| H04N 1/60 | (2006.01) |
| G06F 15/00 | (2006.01) |
| G06K 1/00 | (2006.01) |
| H04N 1/00 | (2006.01) |
| G06K 15/02 | (2006.01) |

(52) U.S. Cl.
CPC .......... *H04N 1/6019* (2013.01); *G06K 15/02* (2013.01); *H04N 1/00015* (2013.01); *H04N 1/00023* (2013.01)

(58) Field of Classification Search
CPC ............. H04N 1/6019; H04N 1/00015; H04N 1/00023; G06K 15/02
See application file for complete search history.

(56) References Cited

U.S. PATENT DOCUMENTS

| | | | |
|---|---|---|---|
| 2016/0065790 A1* | 3/2016 | Matsunaga | G06K 15/102 358/1.9 |
| 2016/0379099 A1* | 12/2016 | Togashi | G06K 15/1878 358/1.9 |

FOREIGN PATENT DOCUMENTS

| | | |
|---|---|---|
| JP | 2008219422 A | 9/2008 |
| JP | 2011114717 A | 6/2011 |

* cited by examiner

*Primary Examiner* — Quang N Vo
(74) *Attorney, Agent, or Firm* — Canon U.S.A., Inc. IP Division

(57) ABSTRACT

An image processing apparatus includes a first adjustment unit for adjusting a color conversion table, used for converting a color to be printed by a printer, by adjusting a selected adjustment color using the selected adjustment color and a target color, a storage unit for storing, in a storage apparatus, a first color conversion table generated by causing the first adjustment unit to adjust the color conversion table for a first adjustment color and a second color conversion table generated by the first adjustment unit to adjust a second adjustment color different from the first adjustment color after generation of the first color conversion table, a cancellation unit for deleting an adjustment result of the first adjustment color, and a second adjustment unit for adjusting the second color conversion table in response to the deletion of the adjustment result of the first adjustment color.

10 Claims, 13 Drawing Sheets ial configuration according to an embodiment of the present invention.

IMAGE PROCESSING APPARATUS, IMAGE PROCESSING METHOD, AND IMAGE PROCESSING PROGRAM THEREFORE

BACKGROUND OF THE INVENTION

Field of the Invention

The present invention relates to an image processing apparatus and an image processing method, in particular, for adjusting a color conversion table on the basis of a signal value corresponding to a color that is visually selected as a target color from a printed chart.

Description of the Related Art

In recent years, electrophotographic apparatuses that achieve image quality comparable to that of printing machines have appeared with their improvement in performance. Printing for, for example, point of purchase (POP) advertising used in stores can therefore be more easily performed at each store. The POP advertising is performed for sales promotion. In the printing for the POP advertising, an output may be printed with a color different from that of a sample because of a difference in printing apparatus or a difference in print timing. In this case, for example, a service person with expert knowledge has performed color matching by adjusting the apparatus. However, in recent years, there have been implemented systems with which, for example, a person in charge in a store can easily perform color matching even if the person has no special expert knowledge. In such a system, for example, a color desired to be adjusted is extracted from an image of a POP display and patches of respective neighboring colors of the extracted color are generated. Subsequently, a chart in which the generated patches are arranged is printed, and a user visually selects the patch of a desired color from the printed patches. A table for color conversion is adjusted in accordance with the color of the selected patch (see Japanese Patent Laid-Open No. 2011-114717).

There is a case where a plurality of colors are adjusted using such a system. In this case, the number of times of adjustment corresponds to the number of colors desired to be adjusted. In a case where a color adjustment is performed a plurality of times, a single color conversion table is adjusted a plurality of times corresponding to the number of colors desired to be adjusted. Each time a single color is adjusted, a color conversion table is stored as the history of an adjustment result. This makes it easy to change a past color adjustment result. For example, after color adjustments have been performed in the order of color 1, color 2, and color 3, only an adjustment result of the color 1 can be easily canceled. However, a color conversion table obtained after the adjustment of the color 2 includes the adjustment result of the color 1. Therefore, in a case where the adjustment result of the color 1 is canceled, the amount of adjustment of the color 1 is also canceled from the color conversion table obtained after the adjustment of the color 2. The same thing can be said for a color conversion table obtained after the adjustment of the color 3. That is, in a case where an adjustment result of a certain color is canceled, the amount of adjustment of the color is also canceled from a color conversion table obtained at the time of a subsequent adjustment. Japanese Patent Laid-Open No. 2008-219422 discloses a technique for canceling all of adjustment results of a color conversion table stored as histories and performing the same adjustments of colors other than a color desired to be canceled again upon a color conversion table. For example, in a case where only an adjustment result of color 1 is canceled after color adjustments have been performed in the order of the color 1, color 2, and color 3, all of the adjustment results of the colors 1 to 3 are canceled and the adjustments of the colors 2 and 3 that are the same as those performed in the past are then performed upon a color conversion table.

SUMMARY OF THE INVENTION

A drawback of conventional techniques is that in a case where the adjustment result of the color 1 is canceled from histories stored at the time of a plurality of color adjustments including the adjustment of the color 3 similar to the color 1 using a known technique, the color 3 may be erroneously changed. For example, in a case where only the adjustment result of the color 1 is canceled after color adjustments have been performed in the order of the color 1, the color 2, and the color 3, the color 3 similar to the color 1 is erroneously changed. That is, on the assumption that a color before the adjustment of the color 3 is a first color and a color after the adjustment of the color 3 is a second color, the color 3 is changed to a third color different from the first and second colors after the adjustment result of the color 1 has been canceled.

In accordance with an aspect of the present invention, the above-discussed drawback is addressed by an image processing apparatus including a first adjustment unit configured to adjust a color conversion table, used for converting a color to be printed by a printer, by adjusting a selected adjustment color using the selected adjustment color and a target color, a storage unit configured to store, in a storage apparatus, a first color conversion table and a second color conversion table, the first color conversion table generated by causing the first adjustment unit to adjust the color conversion table for a first adjustment color, and the second color conversion table generated by the first adjustment unit to adjust a second adjustment color different from the first adjustment color after generation of the first color conversion table, a cancellation unit configured to delete an adjustment result of the first adjustment color, and a second adjustment unit configured to adjust the second color conversion table stored in the storage apparatus by the storage unit in response to the deletion of the adjustment result of the first adjustment color which has been performed by the cancellation unit.

Further features of the present invention will become apparent from the following description of example embodiments with reference to the attached drawings.

DESCRIPTION OF THE EMBODIMENTS

Example embodiments of the present invention will be described below with reference to the accompanying drawings.

First Embodiment

Figure 1:
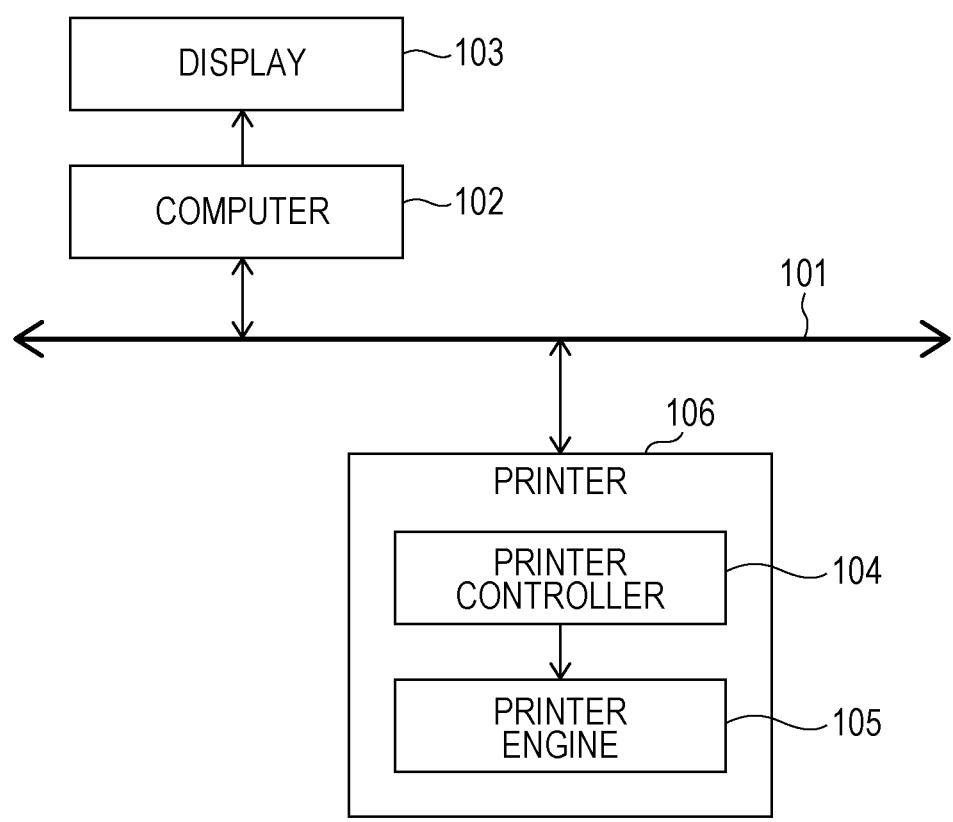
FIG. 1 is a diagram illustrating a configuration of an image forming system including an image processing apparatus according to an embodiment of the present invention.

FIG. 1 is a diagram illustrating a configuration of an image forming system including an image processing apparatus according to an embodiment of the present invention. This image forming system includes a network 101, a computer 102, a display 103, and a printer 106. The printer 106 includes a printer controller 104 and a printer engine 105. The computer 102 and the printer 106 can communicate via the network 101. For example, the computer 102 can transmit a print instruction to the printer 106, and receive information of the printer 106. The computer 102 and the display 103 are connected to each other, and the computer 102 causes a screen output by transmitting screen information of a running application to the display 103. The printer controller 104 and the printer engine 105 are connected to each other, and the printer controller 104 causes a printer output by transmitting a control signal to the printer engine 105.

Figure 2A:
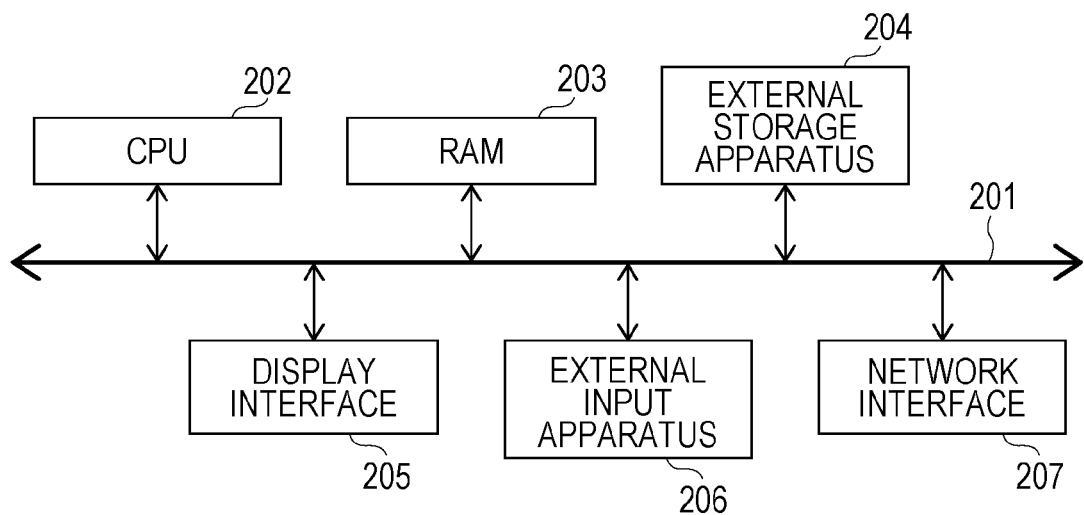
FIGS. 2A and 2B are block diagrams each illustrating a physical configuration according to an embodiment of the present invention.

FIG. 2A is a block diagram illustrating a physical configuration of the computer 102. The computer 102 includes an internal bus 201, a central processing unit (CPU) 202, a random access memory (RAM) 203, an external storage apparatus 204, a display interface 205, an external input apparatus 206, and a network interface 207. The CPU 202, the RAM 203, the external storage apparatus 204, the display interface 205, the external input apparatus 206, and the network interface 207 are connected to the network 101, and perform data communications with the printer 106. When the computer 102 is activated, the CPU 202 reads an application execution program from the external storage apparatus 204 into the RAM 203, and executes the read program. The program being executed by the CPU 202 starts to transmit screen display data to the display interface 205, thereby outputting a screen on the display 103. The CPU 202 monitors user input information provided from the external input apparatus 206. When the user input information is input, the CPU 202 executes processing corresponding to the user input information which is defined in the program.

Figure 2B:
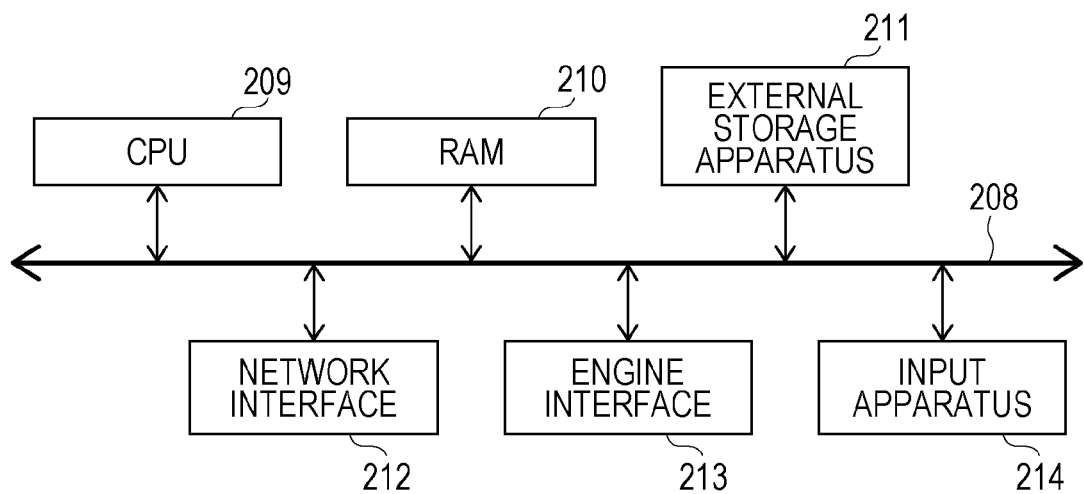

FIG. 2B is a block diagram illustrating a physical configuration of the printer controller 104. The printer controller 104 includes an internal bus 208, a CPU 209, a RAM 210, an external storage apparatus 211, a network interface 212, an engine interface 213, and an input apparatus 214. The CPU 209, the RAM 210, the external storage apparatus 211, the network interface 212, the engine interface 213, and the input apparatus 214 perform data communicates with each other via the internal bus 208. When the printer controller 104 is activated, the CPU 209 reads an execution program from the external storage apparatus 211 into the RAM 210, and executes the read program.

Figure 3A:
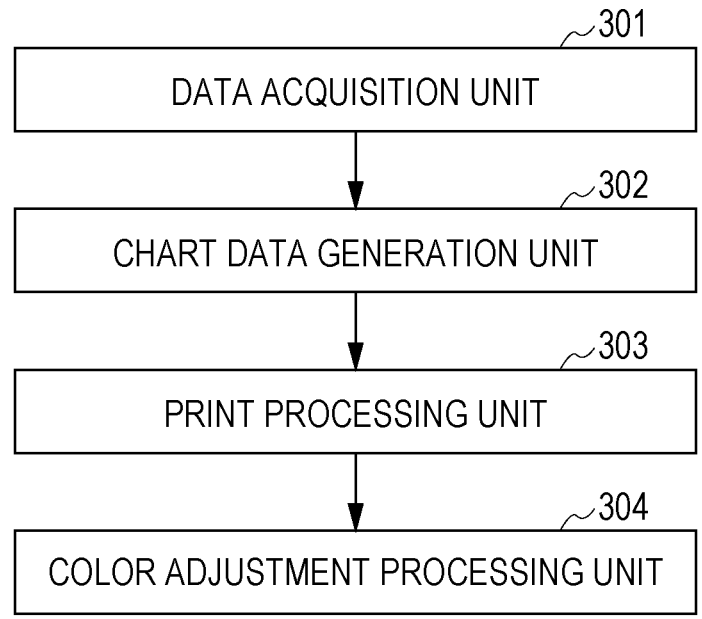
FIGS. 3A and 3B are block diagrams each illustrating a module configuration according to an embodiment of the present invention.

FIG. 3A is a block diagram illustrating a module configuration of a program executed by the CPU 202. Modules of the program executed by the CPU 202 include a data acquisition unit 301, a chart data generation unit 302, a print processing unit 303, and a color adjustment processing unit 304. The data acquisition unit 301 acquires an adjustment-color value (an adjustment value) to be adjusted, table data used for chart generation, and a color conversion table. In this embodiment, the adjustment value is assumed to be a value in a color space used in a typical monitor. Examples of color space used in a monitor include a standard red green blue (sRGB) color space and an Adobe RGB color space. In this description, an adjustment value is assumed to be a value in the sRGB color space, and be an 8-bit integer value ranging from 0 to 255. Furthermore, a color conversion table is assumed to be a table for converting the sRGB into a device-dependent RGB (devRGB) color space. Like an sRGB value, a devRGB value is assumed to be an 8-bit integer value ranging from 0 to 255. This table indicates a relationship between the color value of a color displayed by the display 103 and the color value of a color formed by the printer 106.

Furthermore, table data is used for processing for updating the color conversion table. This table data is assumed to be a table for converting devRGB into Lab. The Lab is a perceptually uniform color space, which is a three-dimensional color space formed to be device-independent in consideration of the visual properties of humans. However, each color space to be used is not limited to those described above. In this embodiment, a Lab value is a real value where L ranges from 0.0 to 100.0 and a and b range from −127.0 to 128.0. The chart data generation unit 302 generates chart data on the basis of data acquired by the data acquisition unit 301. The print processing unit 303 performs print control processing that is used for printing the chart data generated by the chart data generation unit 302 in the printer 106. Specifically, the print processing unit 303 converts the chart data into color space usable by the printer 106, and transmits a result of this conversion to a rendering processing unit 305 to be described below. The color adjustment processing unit 304 acquires a target color value (a target value), and updates the color conversion table using the acquired target value as well as the adjustment value and the color conversion table acquired by the data acquisition unit 301.

Figure 3B:
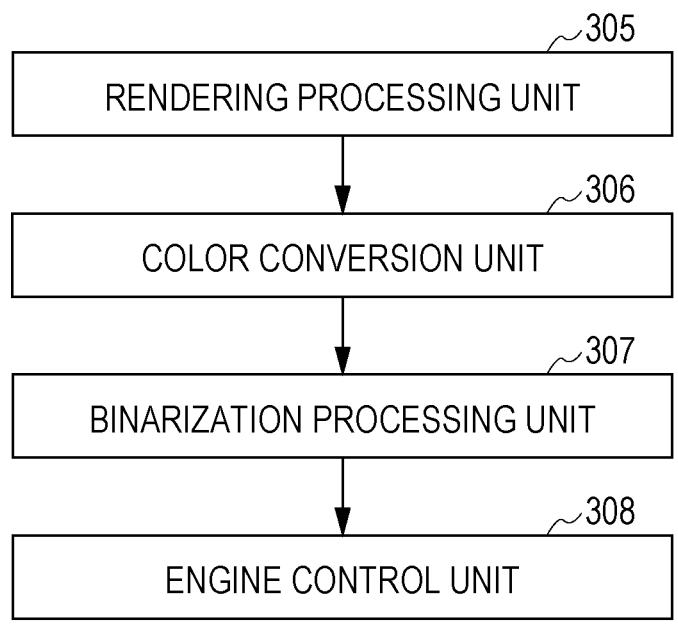

FIG. 3B is a block diagram illustrating a module configuration of a program executed by the CPU 209. Modules of the program executed by the CPU 209 include the rendering processing unit 305, a color conversion unit 306, a binarization processing unit 307, and an engine control unit 308. The rendering processing unit 305 renders image data such as the chart data converted by the print processing unit 303 in an image memory (not illustrated). The color conversion unit 306 converts the image data rendered in the image memory into image data (cyan, magenta, yellow, and black (CMYK)) corresponding to color materials used by the printer engine 105. The binarization processing unit 307 converts the image data resulting from the conversion performed by the color conversion unit 306 into binary image data by performing image forming processing such as screening processing and error diffusion processing, and outputs the binary image data to the engine control unit 308. The engine control unit 308 outputs an instruction for performing printer engine control to the engine interface 213 on the basis of the binary image data resulting from the conversion performed by the binarization processing unit 307. As a result, the printer engine 105 forms an image on a sheet surface as an ink image or a toner image.

Figure 4:
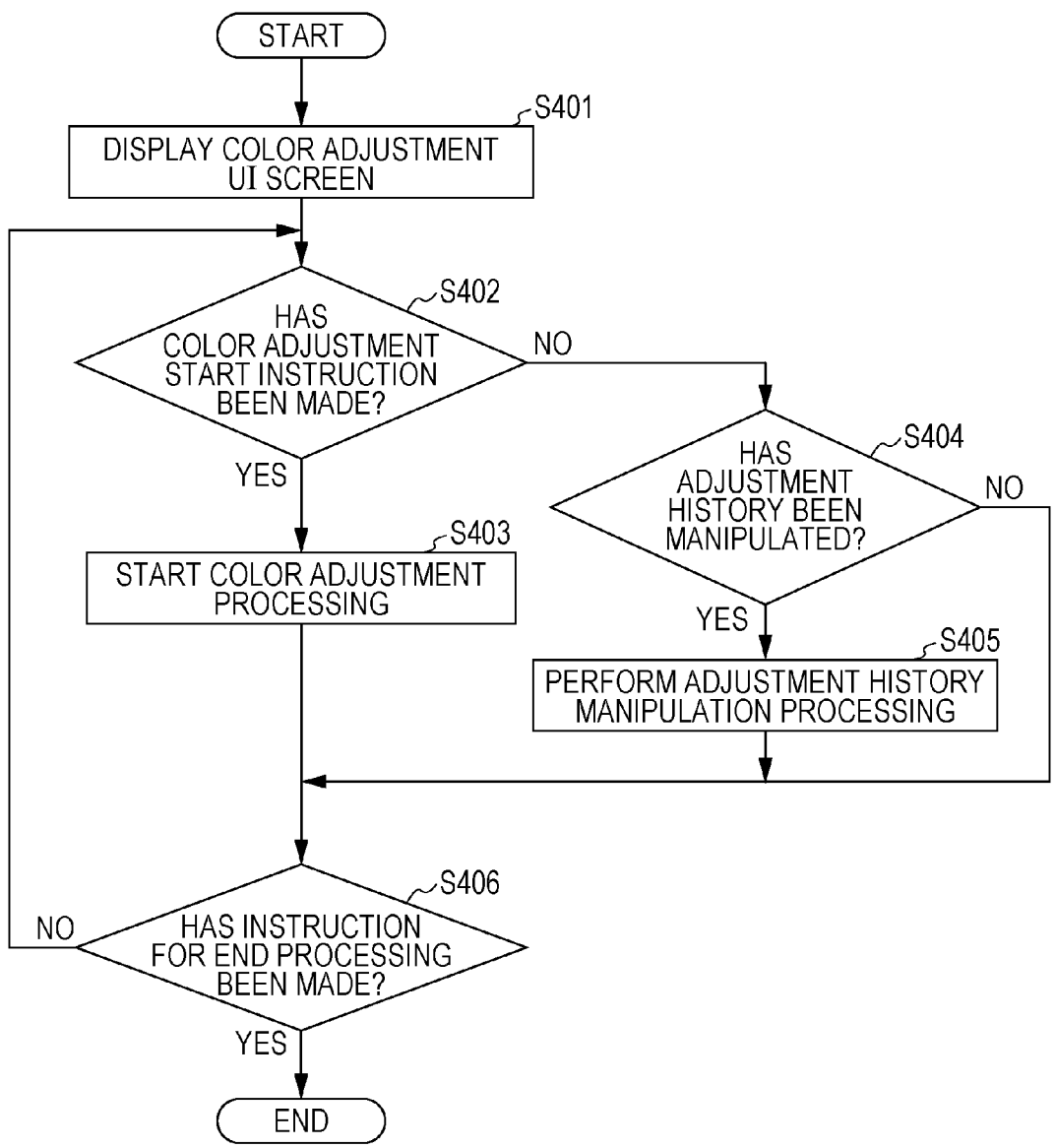
FIG. 4 is a diagram illustrating a process of a system according to a first embodiment of the present invention.

Next, the process of this system will be described with reference to FIG. 4. The CPU 202 in the computer 102 performs all pieces of processing illustrated in FIG. 4.

Figure 11:
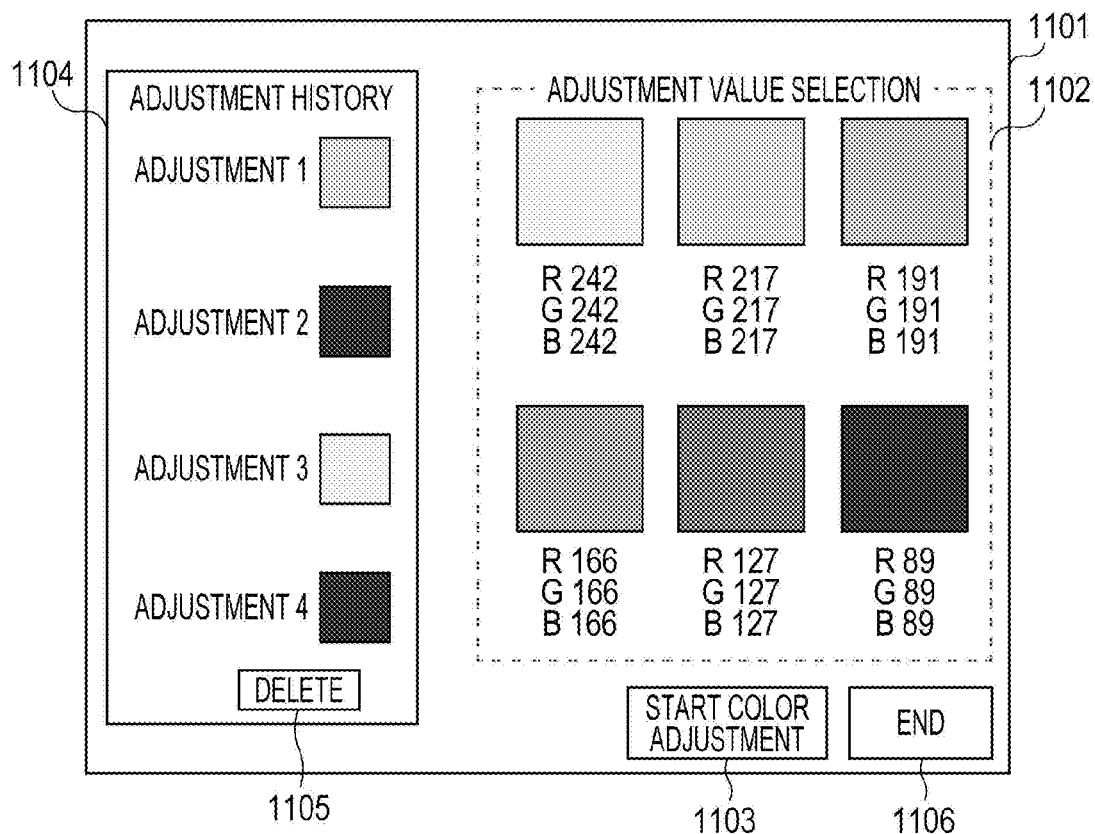
FIG. 11 is a diagram illustrating an example of a color adjustment UI screen according to the first embodiment.

First, in step S401, the CPU 202 displays a user interface (UI) screen for color adjustment on the display 103. For example, the CPU 202 displays a UI screen illustrated in FIG. 11 on which adjustment value selection patches and adjustment histories are arranged. In step S402, the CPU 202 determines whether an instruction for starting color adjustment has been made via the UI. For example, the CPU 202 determines that a color adjustment start instruction has been made when a color adjustment start button 1103 is pressed. In a case where it is determined in step S402 that a color adjustment start instruction has been made, the CPU 202 starts color adjustment processing in step S403. A process after color adjustment processing has started will be described in detail later. In a case where it is determined in step S402 that a color adjustment start instruction has not been made, the CPU 202 determines whether an adjustment history has been manipulated via the UI in step S404. For example, the CPU 202 determines that an adjustment history has been manipulated when one of adjustments in an adjustment history UI 1104 illustrated in FIG. 11 is selected or a delete button 1105 is pressed. In a case where it is determined in step S404 that an adjustment history has been manipulated, the CPU 202 performs adjustment history manipulation processing in step S405. The adjustment history manipulation processing will be described in detail later. In a case where the processing of step S403 or S405 has ended or it is determined in step S404 that an adjustment history manipulation has not been performed, the CPU 202 determines whether an instruction for end processing has been made via the UI in step S406. For example, the CPU 202 determines that an instruction for end processing has been made when an end button 1106 illustrated in FIG. 11 is pressed. In a case where it is determined in step S406 that an instruction for end processing has been made, the operation of the system ends. On the other hand, in a case where it is determined in step S406 that an instruction for end processing has not been made, the process returns to step S402.

Figure 5:
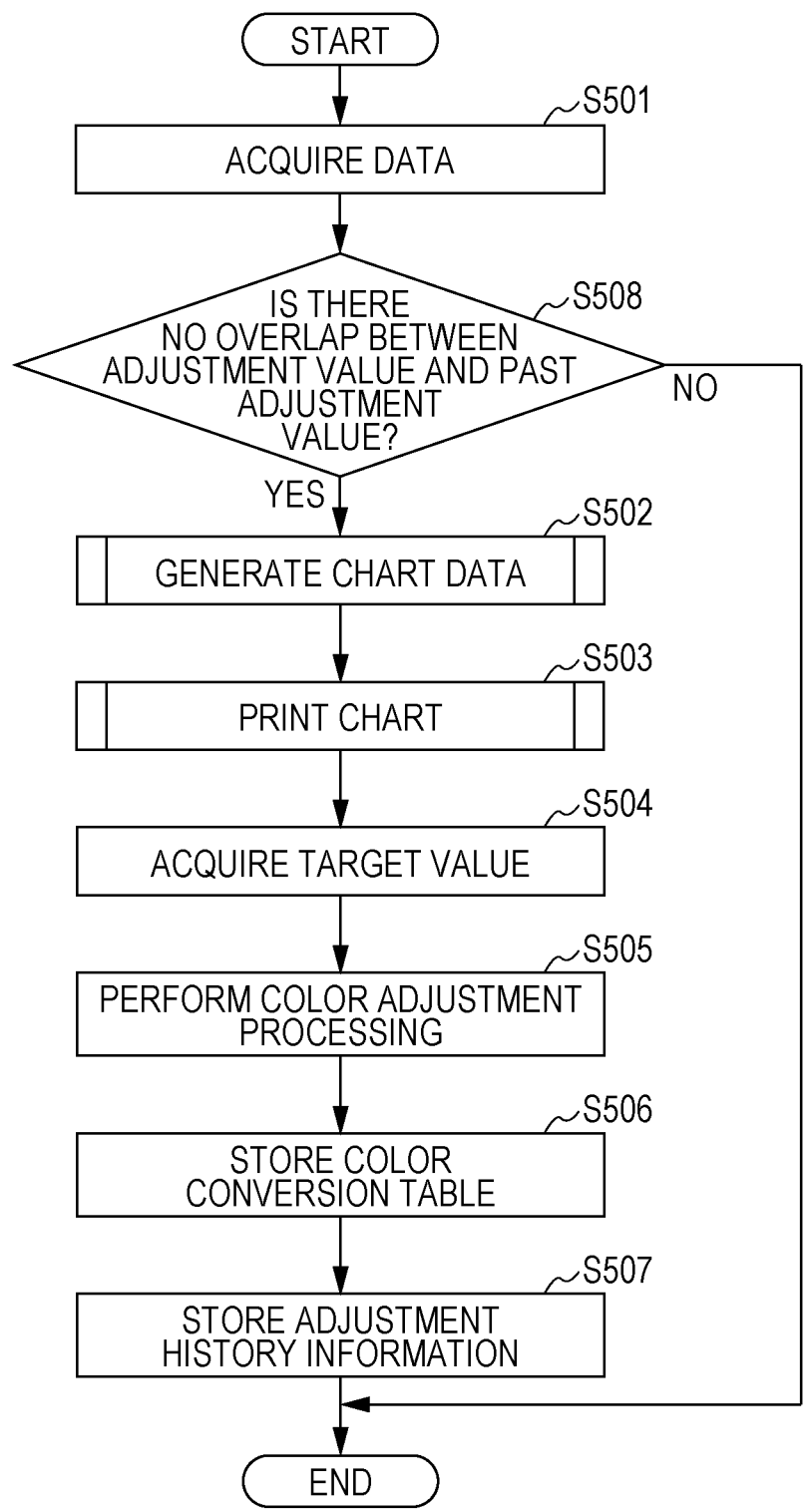
FIG. 5 is a flowchart illustrating a chart generation and color adjustment process according to the first embodiment.
Figure 7:
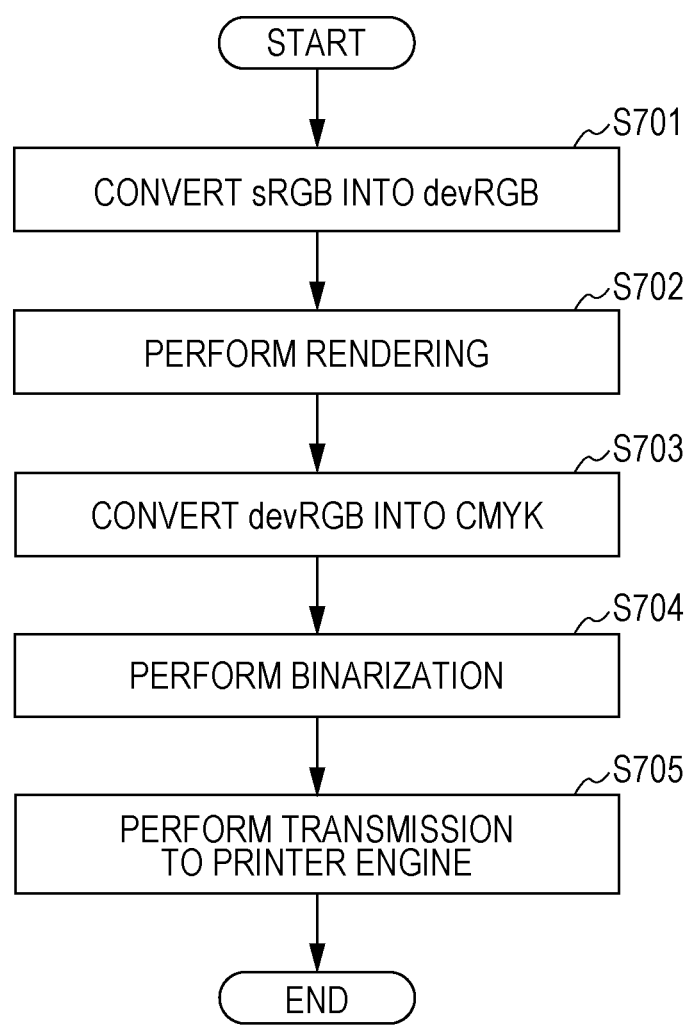
FIG. 7 is a flowchart illustrating a print process according to the first embodiment.

Next, the process after the color adjustment processing has started in step S403 in FIG. 4 will be described in detail with reference to FIGS. 5 and 7.

A process of adjusting a color conversion table will be described with reference to FIG. 5. In this process, a target color and a target value corresponding to the target color are visually selected from a printed chart and a color conversion table is adjusted on the basis of the selected target value. In the process illustrated in FIG. 5, the CPU 202 in the computer 102 performs pieces of processing of steps S501, S502, and S504 to S508, and the CPU 209 in the printer controller 104 performs processing of step S503.

In step S501, the data acquisition unit 301 acquires an adjustment value and a color conversion table as well as a table and adjustment history information used for chart data generation. The adjustment value may be acquired by allowing a user to select one of some sRGB combinations prepared in advance. Alternatively, a mechanism for allowing the user to input an sRGB value via a UI may be adopted. Still alternatively, in a case where there is image data of, e.g., a POP display including a color desired to be changed, an sRGB value may be acquired from the image data as an adjustment value. The color conversion table is a table that is stored in the external storage apparatus 204 of the computer 102 or the external storage apparatus 211 of the printer 106 to be used at the time of printing. The table used for chart data generation is a devRGB-to-Lab conversion table for converting devRGB into Lab which is prepared in advance. For example, the devRGB-to-Lab conversion table is created as follows. First, a chart dedicated to table creation is printed by a printer. Next, a Lab value is acquired by measuring the printed chart, and a devRGB value is associated with the acquired Lab value.

In step S508, the chart data generation unit 302 compares the adjustment value and the adjustment history information acquired in step S501 with each other to determine whether the acquired adjustment value and an adjustment value stored as the adjustment history overlap. The presence of an overlap means that the same color has been adjusted in the past. In a case where it is determined in step S508 that there is an overlap, the process ends. In a case where it is determined in step S508 that there is no overlap, the chart data generation unit 302 generates chart data in step S502 on the basis of the data acquired in step S501. The chart data generation will be described in detail later.

In step S503, the print processing unit 303 prints a chart using the chart data generated in step S502. This print processing will be described in detail later.

The color adjustment processing unit 304 performs the process from step S504 to step S506. In step S504, the color adjustment processing unit 304 acquires, as a target value, an sRGB value of a patch selected by a user from among patches arranged in the chart printed in step S503. For example, the chart generated in step S502 is displayed on the display 103. A mechanism for allowing a user to select one of patches arranged in the chart displayed on the display 103 is provided, and the sRGB value of the selected patch is acquired. Alternatively, the coordinate position of each patch may be added to the chart when the chart is printed, and the coordinate position of the patch selected by a user may be input.

In step S505, color adjustment processing is performed using the adjustment value and the color conversion table acquired in step S501 and the target value acquired in step S504. In the color adjustment processing, a corresponding part of the color conversion table is adjusted so that an output value obtained by converting the adjustment value using the color conversion table is the same as an output value obtained by converting the target value using the color conversion table. As an example, it is assumed that the sRGB value of the adjustment value is (150, 0, 0) and the devRGB value of the output value resulting from color conversion using the color conversion table before adjustment is (120, 0, 0). It is further assumed that the sRGB value of the target value selected by the user is (150, 20, 0) and the devRGB value of the output value after the color conversion is (120, 15, 0). In this case, the color conversion table for sRGB (predetermined color space) to devRGB (device-dependent color space) conversion is adjusted so that the sRGB output value (150, 0, 0) of the adjustment value becomes the devRGB output value (120, 15, 0) of the target value after the color conversion. Color blurring or gradation steps may occur in the color conversion table after adjustment depending on the target value. Therefore, it is desired that smoothing processing be performed for the neighboring colors of the adjusted part of the color conversion table.

In step S506, the color conversion table adjusted in step S505 is stored in the external storage apparatus 204 of the computer 102 or the external storage apparatus 211 of the printer 106. The color conversion table may be stored by overwriting the color conversion table acquired in step S501, or may be stored as a different color conversion table.

In step S507, adjustment history information is stored in the external storage apparatus 204. The adjustment history information includes at least the adjusted color conversion table and information about an adjusted lattice point in this embodiment. A lattice point represents a single element such as RGB or Lab forming a color conversion table.

Figure 6:
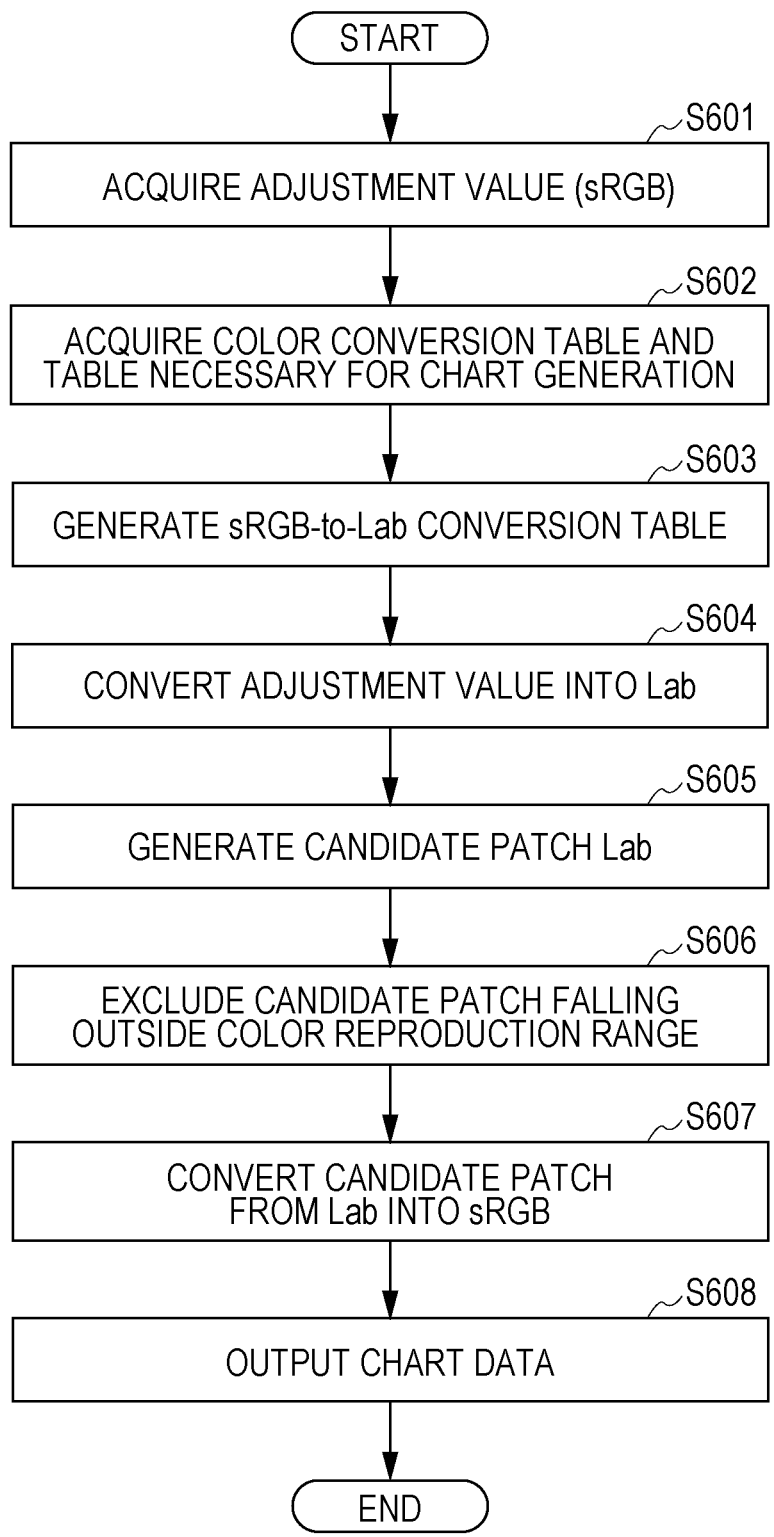
FIG. 6 is a flowchart illustrating a chart generation process according to the first embodiment.

Next, the chart data generation processing in step S502 will be described in detail with reference to FIG. 6. As described above, the chart data generation unit 302 performs all pieces of processing in FIG. 6.

In step S601, the adjustment value acquired in step S501 is acquired. In step S602, the color conversion table and the table data used for chart data generation, which have been acquired in step S501, are acquired.

In step S603, a table for converting each of the adjustment value and the target value into a Lab value (sRGB-to-Lab conversion table) is generated. The sRGB-to-Lab conversion table is generated by combining the color conversion table (the sRGB-to-devRGB conversion table) and the table used for chart generation (the devRGB-to-Lab conversion table) which have been acquired in step S602. The combining is performed using, for example, interpolation calculation. In the interpolation calculation, in a case where a value not defined in a calculation table is input, interpolation is performed using a value that is defined in the calculation table and close to the input value. Examples of the interpolation calculation include tetrahedral interpolation. In the tetrahedral interpolation, interpolation calculation is performed using four values which are defined in a calculation table and close to an input value. In this processing, an input is assumed to be a devRGB value in the sRGB-to-devRGB conversion table, and the sRGB-to-Lab conversion table is generated by performing calculation for the tetrahedral interpolation, using the devRGB-to-Lab conversion table as the calculation table. In this embodiment, the tetrahedral interpolation is used for the combining. However, any method may be used under the condition that the sRGB-to-Lab conversion table can be generated from the sRGB-to-devRGB conversion table and the devRGB-to-Lab conversion table.

In step S604, the adjustment value is converted into a Lab value. In this conversion, the sRGB value of the adjustment value is converted into the Lab value using the sRGB-to-Lab conversion table generated in step S603. This conversion is executed by performing the tetrahedral interpolation in which the adjustment value is an input and the sRGB-to-Lab conversion table is used as the calculation table.

In step S605, on the basis of the Lab value of the adjustment value generated in step S604, a Lab value is generated to generate a color patch to be a candidate (a candidate patch) used for the selection of a target value. The Lab value of the candidate patch is generated by converting each of L, a, and b values in a stepwise manner on the basis of the Lab value of the adjustment value and combining resultant values. The L, a, and b values are generated using the following expression.

$Li = Lb + i \times \mathrm{Dist}$ $ai = ab + i \times \mathrm{Dist}$ $bi = bb + i \times \mathrm{Dist}$ $(-n \leq i \leq n)$ (Expression 1)

In this expression, "Lb", "ab", and "bb" represent the Lab value of the adjustment value, "i" represents a value (an integer value) that varies in a stepwise manner in accordance with the number of candidate patches to be generated, and "Dist" represents a distance between the candidate patches in Lab color space. As an example, it is assumed that the Lab value of the adjustment value is (50, 0, 0), 27 patches are generated, and "Dist" is 1. In this case, three patches are created in each of the L, a, and b directions, and "i" therefore becomes −1, 0, and 1. Accordingly, "Li" becomes 49, 50, and 51, "ai" becomes −1, 0, and 1, and "bi" becomes −1, 0, 1. By combining all these values, 27 candidate-patch Lab values are generated. These candidate-patch Lab values correspond to neighboring values of the Lab value of the adjustment value, and the colors of the candidate patches are expressed by respective neighboring colors of the adjustment color. The patch of the neighboring color is hereinafter referred to as "candidate patch".

In step S606, candidate-patch exclusion processing is performed. In this processing, the candidate patch falling outside a printer color reproduction range is excluded from the candidate patches generated in step S605. The candidate patches are generated in the Lab color space, i.e., in the device-independent color space. The candidate patch falling outside the printer color reproduction range may therefore be generated. The candidate patch falling outside the printer color reproduction range is rounded to the color range reproducible by the printer. In this embodiment, such a patch is therefore excluded. The candidate-patch exclusion processing may be performed in any method on the condition that the method can prevent the candidate patch determined to fall outside the color reproduction range from being selected as the target value. The determination of whether a candidate patch falls outside the color reproduction range is made on the basis of whether the Lab value of the candidate patch is included in the range of the Lab values of the devRGB-to-Lab conversion table acquired in step S602. More specifically, this determination is performed by determining whether the Lab value of the candidate patch is present in a tetrahedron in Lab color space. The tetrahedron is formed of a predetermined Lab value and three neighboring Lab values thereof in the devRGB-to-Lab conversion table. It is determined whether the candidate patch is present in all tetrahedrons that can be formed using the Lab values of the devRGB-to-Lab conversion table. In a case where the candidate patch is determined to be absent in all tetrahedrons, this candidate patch is determined to fall outside the color reproduction range. In this embodiment, this determination is performed by the method using the tetrahedron that can be formed from the devRGB-to-Lab conversion table. However, any method may be employed on the condition that the method can extract a printer color reproduction range and determine whether a candidate patch falls outside the color reproduction range.

In step S607, the candidate patches that remains after the patch falling outside the color reproduction range has been excluded in step S606 are converted into sRGB values. The conversion from a Lab value into an sRGB value is performed by signal search processing using the sRGB-to-Lab conversion table generated in step S603. In the signal search processing, first, the tetrahedral interpolation is performed in which all signal value combinations of the sRGB values of 0 to 255 are input and the sRGB-to-Lab conversion table is used as a calculation table. Of all Lab values calculated by the tetrahedral interpolation, a Lab value closest to the Lab value of a predetermined candidate patch is extracted. An sRGB value corresponding to the extracted Lab value is set as the sRGB value of the candidate patch. The candidate patches generated and arranged in the form of the Lab values are converted into sRGB values by performing this signal search processing upon all candidate patches. In this embodiment, the signal search processing is performed. However, for example, the Lab value of a candidate patch may be converted into an sRGB value by creating and using a reverse table of the sRGB-to-Lab conversion table (i.e., a Lab-to-sRGB conversion table).

In step S608, the candidate patches of the sRGB values generated in step S607 are arranged using a predetermined method and are then transmitted to the print processing unit 303 as a single piece of chart data. The patches may be simply arranged in the order of storage of pieces of data or may be arranged so that they appear to smoothly change in consideration of visual properties of humans. All of the candidate patches do not necessarily have to be arranged. Some of the candidate patches may be extracted and only the extracted candidate patches may be arranged.

Next, the chart print processing in step S503 in FIG. 5 will be described in detail with reference to FIG. 7. In step S701, the print processing unit 303 performs color conversion of a color value included in the chart data generated in step S502 using the color conversion table acquired in step S501. That is, the print processing unit 303 converts color space of a color value included in the chart data from the sRGB into the devRGB. The print processing unit 303 transmits the color value in the chart data, which has been subjected to color conversion, to the rendering processing unit 305. In step S702, the rendering processing unit 305 renders image data in an image memory on the basis of the chart data received from the print processing unit 303. The rendering processing unit 305 transmits the image data rendered in the image memory to the color conversion unit 306. In step S703, the color conversion unit 306 converts the image data into CMYK data using a color conversion table for converting an output RGB (devRGB) into CMYK, which is stored in advance in the external storage apparatus 211, and transmits the CMYK data to the binarization processing unit 307. In step S704, the binarization processing unit 307 converts the received data, which has been subjected to color conversion, into binary image data by performing pieces of image forming processing such as screening processing and error diffusion processing upon the data. The binarization processing unit 307 outputs the binary image data to the engine control unit 308. In step S705, the engine control unit 308 outputs an instruction for performing printer engine control to the engine interface 213 on the basis of the binary image data that has been subjected to the conversion in step S704. As a result, the printer engine 105 forms an ink image or a toner image on a sheet surface.

Figure 8:
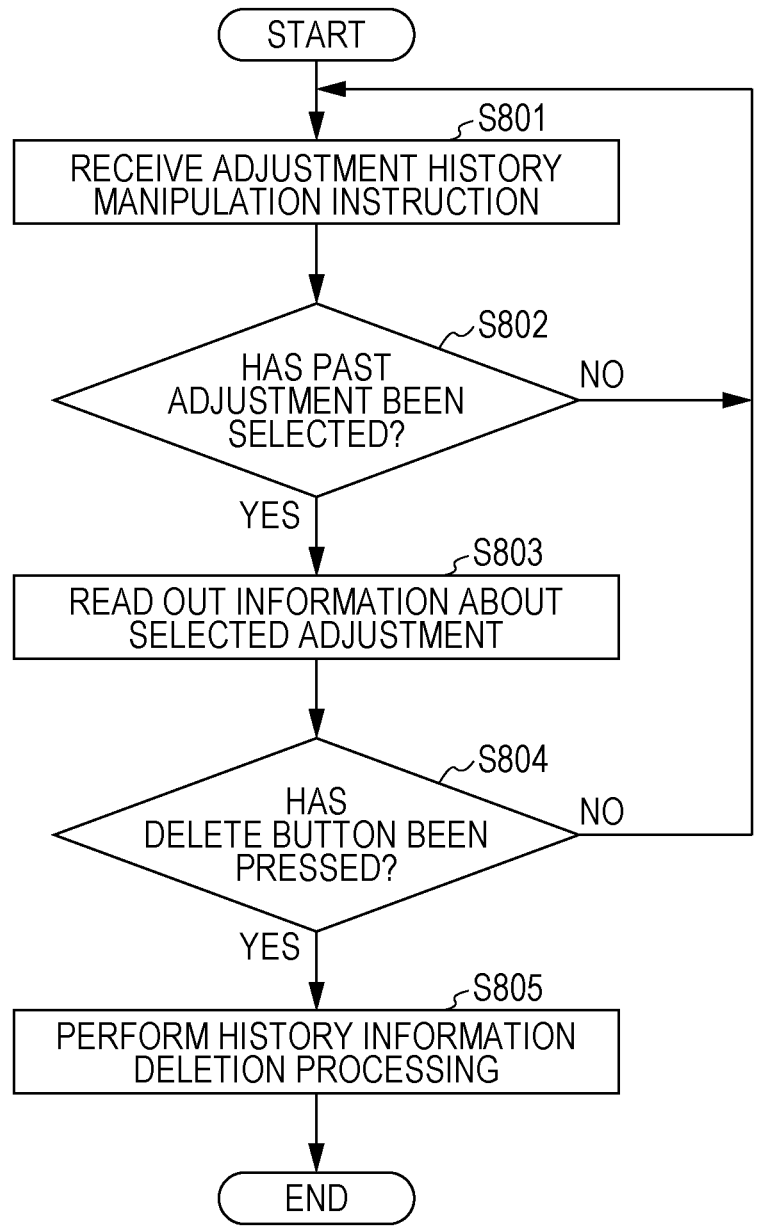
FIG. 8 is a diagram illustrating an adjustment history manipulation process according to the first embodiment.

The adjustment history manipulation processing in step S405 in FIG. 4 will be described in detail with reference to FIG. 8. The CPU 202 in the computer 102 performs all pieces of processing in FIG. 8.

In step S801, the CPU 202 receives an instruction made via the adjustment history UI 1104. In step S802, the CPU 202 determines whether one of adjustment results has been selected via the adjustment history UI 1104 on the basis of the instruction received in step S801. In a case where it is determined in step S802 that all of the adjustment results have not been selected via the adjustment history UI 1104, the process returns to step S801. In a case where it is determined in step S802 that one of the adjustment results has been selected via the adjustment history UI 1104, the process proceeds to step S803. In step S803, the CPU 202 reads information about the selected adjustment result (the information about the adjusted color conversion table and the information about the adjusted lattice point which have been stored in step S507) into the RAM 203 from the external storage apparatus 204 so as to allow a user to manipulate the adjustment result information.

The manipulation of the adjustment result information means making an instruction for changing a past adjustment result. This change instruction includes the deletion of an adjustment result. In a case where the deletion of an adjustment result is performed, the information stored in step S507 in FIG. 5 (the information about the adjusted color conversion table and the information about the adjusted lattice point) is deleted from the external storage apparatus 204.

In step S804, the CPU 202 determines whether the delete button 1105 has been pressed via the adjustment history UI 1104. In a case where it is determined in step S804 that the delete button 1105 has not been pressed, the process returns to step S801. In a case where it is determined in step S804 that the delete button 1105 has been pressed, the process proceeds to step S805. In step S805, history information deletion processing is performed.

Figure 9:
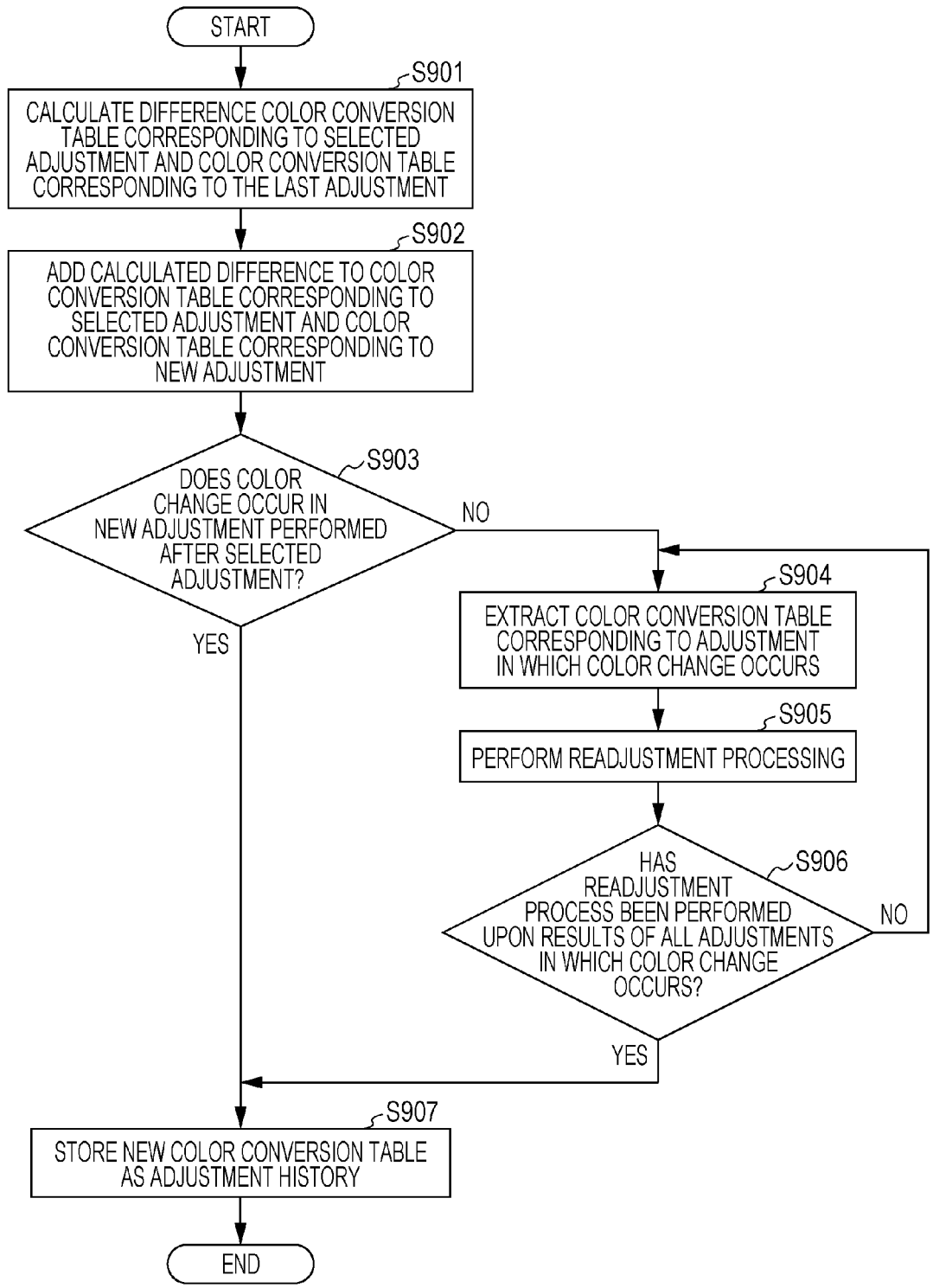
FIG. 9 is a flowchart illustrating an adjustment history deletion process according to the first embodiment.

This history information deletion processing will be described with reference to FIG. 9. The CPU 202 in the computer 102 performs all pieces of processing in FIG. 9.

In step S901, the CPU 202 reads out the adjustment result selected as a history information deletion target and a result of an adjustment performed immediately before the selected adjustment result (an adjustment result obtained immediately before the selected adjustment result as history information) from the external storage apparatus 204. The CPU 202 extracts, from the read adjustment results, conversion tables generated at the time of adjustments of respective colors. The CPU 202 calculates a difference between the color conversion table corresponding to the adjustment result selected as a history information deletion target and the color conversion table corresponding to the adjustment result obtained immediately before the selected adjustment result. In the calculation of the difference, a difference between each lattice point included in the color conversion table corresponding to the selected adjustment result and a corresponding lattice point included in the color conversion table corresponding to the adjustment result obtained immediately before the selected adjustment result is calculated.

Figure 12:
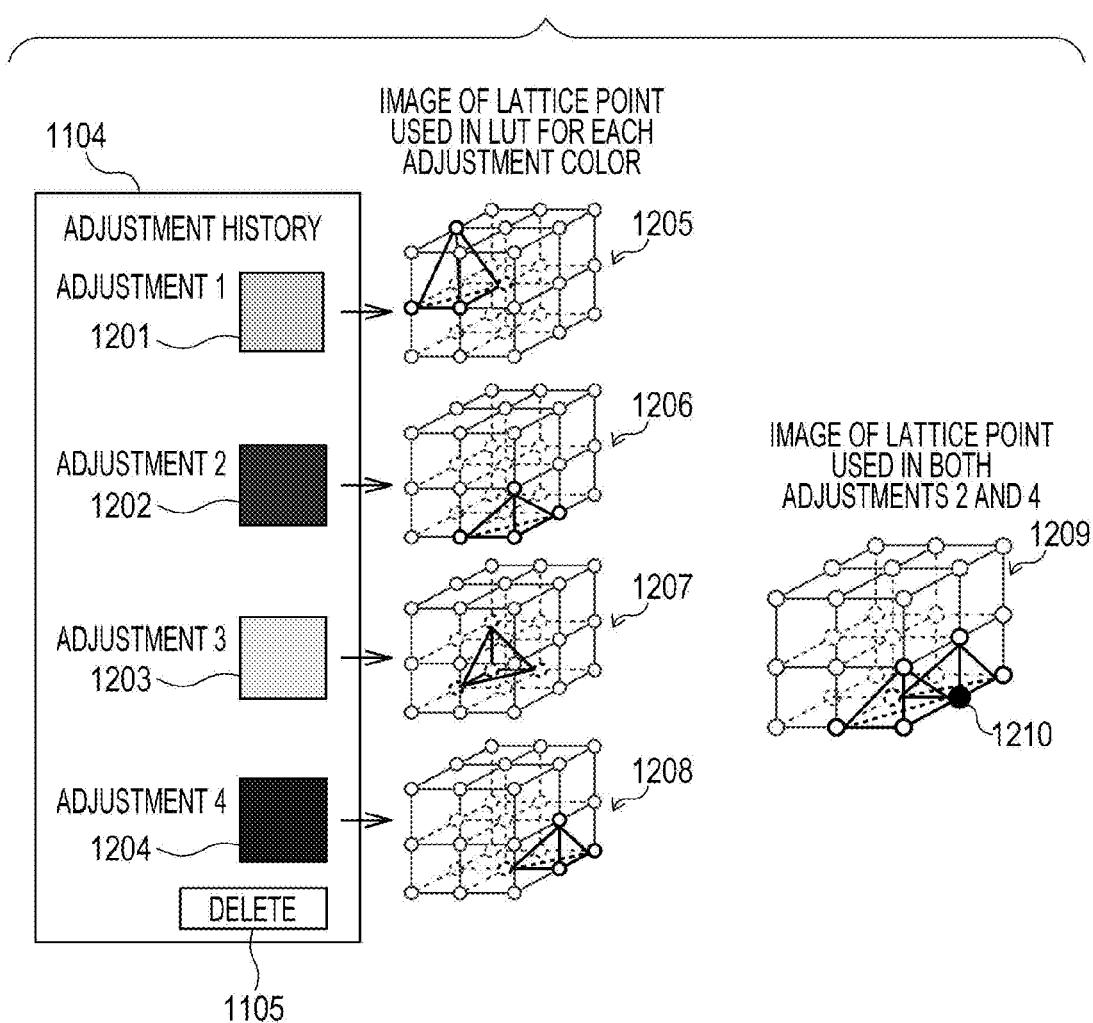
FIG. 12 is a conceptual diagram illustrating color conversion tables according to the first embodiment stored as an adjustment histories and lattice points.

For example, processing performed in a case where an adjustment 2 (1202) illustrated in FIG. 12 is selected as a history information deletion target will be described. A difference between each lattice point in a color conversion table (1206) corresponding to the adjustment result of the adjustment 2 and a corresponding lattice point in a corresponding lattice point in a color conversion table (1205) generated at an adjustment 1 performed immediately before the adjustment 2 is calculated.

In step S902, the CPU 202 adds the difference calculated in step S901 to corresponding lattice points in color conversion tables corresponding to the adjustment result selected as a deletion target and a new adjustment result of an adjustment performed after the selected adjustment result.

For example, a case where the adjustment result of the adjustment 2 (1202) in FIG. 12 is selected as a history information deletion target will be described.

Each lattice point included in the color conversion table (1206) corresponding to the adjustment 2 is compared with corresponding lattice points in color conversion tables (1207 and 1208) corresponding to adjustments 3 and 4 performed after the adjustment 2. To these lattice points, the corresponding calculated difference is added.

In step S903, the CPU 202 determines whether, among the new adjustment results obtained after the adjustment result selected as a deletion target, there is an adjustment result in which a color change occurs because of the deletion of the selected adjustment result. This determination is performed by determining whether lattice points used to express the color of the adjustment result selected as a deletion target are used to express a color in a new adjustment performed after the selected adjustment result.

A lattice point used to express a color means a lattice point having a neighboring RGB value of the RGB value of the color. More specifically, in a case where the above-described tetrahedral interpolation is used for color conversion using a color conversion table, a lattice point used to express a color means four neighboring lattice points.

In the extraction of the four neighboring lattice points, the distance between the RGB value of a predetermined color and the RGB value of each lattice point in a color conversion table is calculated and four lattice points are extracted in order of increasing distance to the RGB value of the predetermined color. Alternatively, it may be determined which of tetrahedrons formed of four lattice points in a color conversion table includes the RGB value of a predetermined color, and four lattice points in a tetrahedron determined to include the RGB value of the predetermined color may be extracted.

For example, referring to FIG. 12, a lattice point 1210 is used to adjust an adjustment target color in both the adjustment 2 and the adjustment 4. Therefore, in a case where the adjustment result of the adjustment 2 (1202) is selected as a deletion target, the adjustment result of the adjustment 4 (1204) is determined to be subjected to color change because of the deletion of the adjustment result of the adjustment 2 (1202).

In a case where it is determined in step S903 that a color change does not occur, the CPU 202 stores the color conversion table resulting from the addition of the difference in step S902 by replacing the original color conversion table stored as the adjustment history with it in step S907.

In a case where it is determined in step S903 that a color change occurs, the CPU 202 selects one of adjustment results where a color change occurs and extracts a color conversion table corresponding to the selected adjustment result in step S904.

In step S905, the CPU 202 performs readjustment processing. The readjustment processing will be described in detail later.

In step S906, the CPU 202 determines whether the readjustment processing of step S905 has been performed upon all of the adjustment results determined to be subjected to color change in step S903. In a case where it is determined in step S906 that all of the adjustment results have been subjected to the readjustment processing, the CPU 202 stores a color conversion table obtained after the readjustment processing by replacing the original color conversion table stored as the adjustment history with it in step S907. In a case where it is determined in step S906 that all of the adjustment results have not been subjected to the readjustment processing, the process returns to step S904.

Next, the readjustment processing of step S905 in FIG. 9 will be described with reference to FIG. 13.

Figure 13:
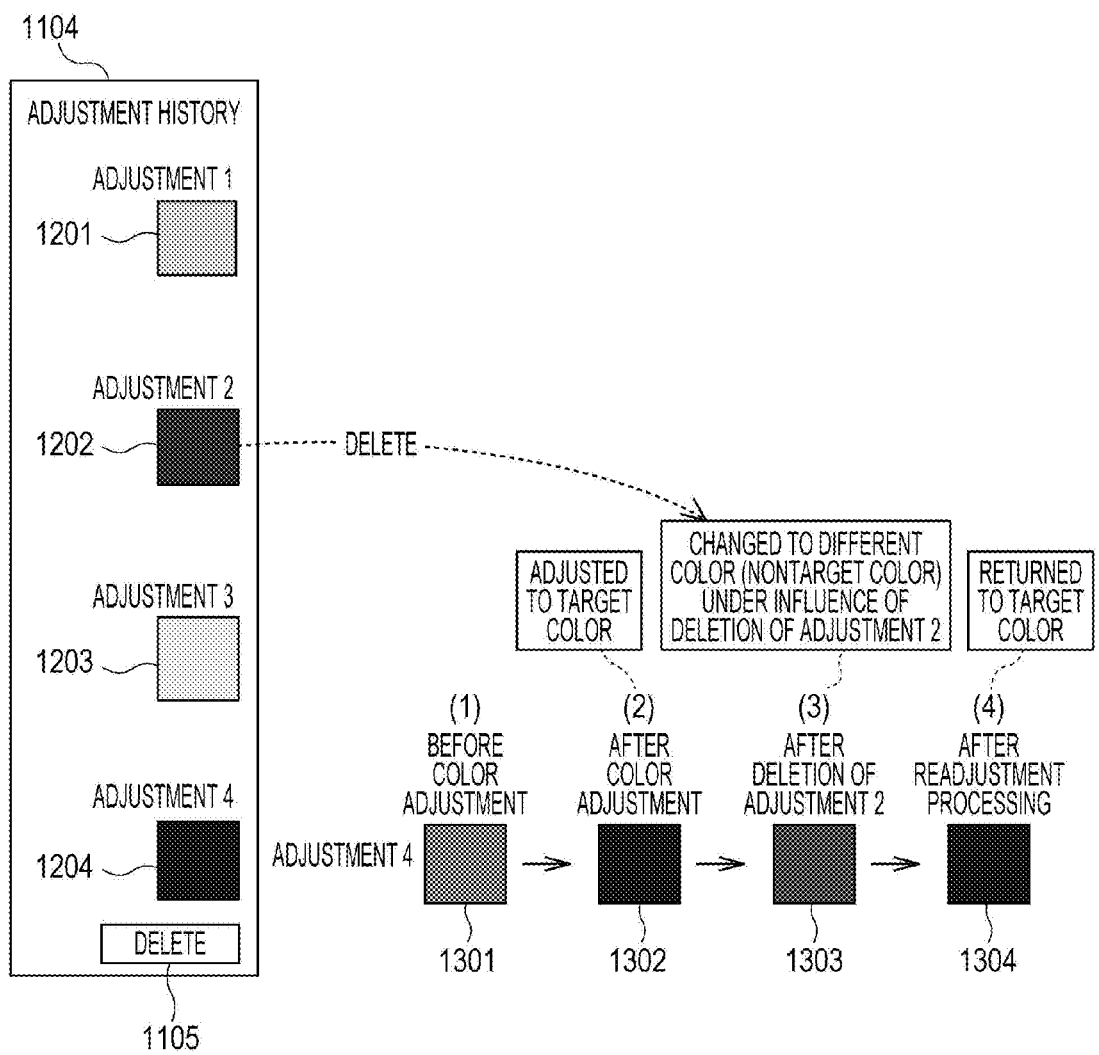
FIG. 13 is a conceptual diagram illustrating a color change that occurs at the time of a readjustment process according to the first embodiment.

Referring to FIG. 13, a pre-color adjustment patch 1301 shows an example of a color image before a color adjustment is performed upon the adjustment 4. In this example, it is assumed that the color of the pre-color adjustment patch 1301 is adjusted using this system and is then changed to a target color, that is, the color of a post-color adjustment patch 1302. In a case where the history information deletion processing of step S805 in FIG. 8 is performed upon the adjustment result of the adjustment 2 in this state, the adjustment target color of the adjustment 4 that approximates to the adjustment target color of the adjustment 2 is changed to a nontarget color (a post-adjustment result deletion patch 1303 that is a patch obtained after the deletion of the adjustment result of the adjustment 2). The readjustment processing returns the color (nontarget color) of the post-adjustment result deletion patch 1303, which is obtained after deletion of the adjustment result of the adjustment 2, back to the target color that is the color of the post-color adjustment patch 1302. That is, the readjustment processing maintains the original adjustment result (color conversion table) even after the adjustment result (color conversion table) of an adjustment for another adjustment target color has been deleted (to make the colors of the patches 1302 and 1304 conform to each other).

Figure 10:
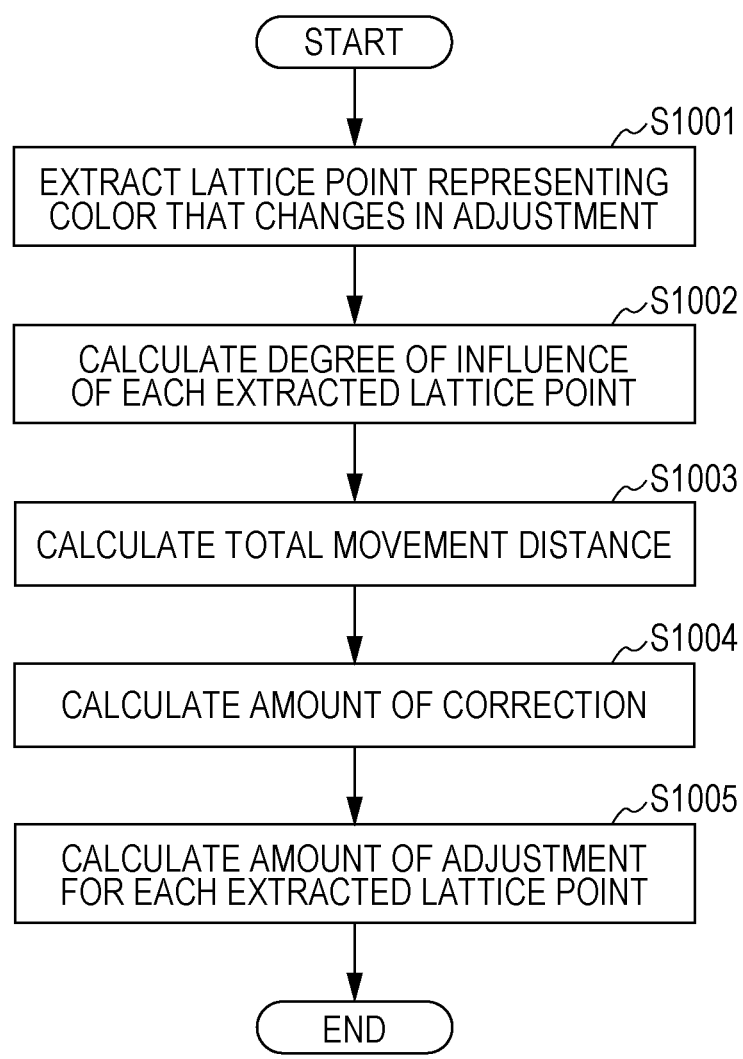
FIG. 10 is a flowchart illustrating a readjustment process according to the first embodiment.

Next, the readjustment process will be described in detail with reference to FIG. 10. The CPU 202 in the computer 102 performs all pieces or processing illustrated in FIG. 10.

In step S1001, the CPU 202 extracts, from lattice points included in the color conversion table affected by the deletion of an adjustment result of another color which has been extracted in step S904, a lattice point used to express a color that is changed under the influence of the deletion. In this extraction, a lattice point having a neighboring sRGB value of the sRGB value of the color. In a case where the above-described tetrahedral interpolation is used for color conversion, four neighboring lattice points are extracted. In this extraction, the distance between the sRGB value of the color and the sRGB value of each lattice point in the color conversion table is calculated and four lattice points are extracted in order of increasing distance to the RGB value of the color. Alternatively, it may be determined which of tetrahedrons formed of four lattice points in the color conversion table includes the sRGB value of the color, and four lattice points in a tetrahedron determined to include the sRGB value of the color may be extracted.

In step S1002, the CPU 202 calculates the degree of influence of each lattice point extracted in step S1001. The degree of influence is determined in accordance with the distance between the sRGB value of the extracted lattice point and the sRGB value of the color that is the selected adjustment result, and indicates how much effect the extracted lattice point has on a selected adjustment color. The closer the distance to the selected color, the higher the degree of influence of a lattice point. That is, the lattice point contributes largely to the expression of the color. In the calculation of the degree of influence, first, the distance between the sRGB value of the selected adjustment color and the sRGB value of the extracted lattice point is calculated using expression 2.

$$\text{Dist}(n) = \text{sqrt}((Rch - R(n))^2 + (Gch - G(n))^2 + (Bch - B(n))^2) \quad \text{(Expression 2)}$$

In this expression, "Dist(n)" represents a distance (n represents a value for identifying an extracted lattice point), "Rch•Gch•Bch" represents the sRGB value of a selected adjustment color, and "R(n)•G(n)•B(n)" represents the sRGB value of an extracted lattice point. Furthermore, "sqrt" represents calculation of a square root.

Subsequently, the degree of influence is calculated from the calculated distance. In this calculation, the calculated distance is normalized so that the sum of the degrees of influences of the extracted lattice points becomes one using expression 3.

$$\text{Coe}(n) = \text{Dist}(n)/\Sigma\text{Dist}(n) \qquad \text{(Expression 3)}$$

In this expression, "Coe(n)" represents the degree of influence (n represents a value for identifying an extracted lattice point) and "Σ" represents the calculation of a sum.

In step S1003, the CPU 202 calculates a total movement distance. The total movement distance is the sum of movement distances of respective lattice points. The movement distance of each lattice point is obtained by multiplying the difference between devRGB values before and after the change in devRGB value of the lattice point caused by the deletion by the degree of influence, and is calculated using expression 4. The reason why the difference is multiplied by the degree of influence is because the amount of color expression contribution of one of lattice points (four lattice points in this case) is considered.

$$\text{move}R(n) = \text{Coe}(n) \times (R(n)\text{before} - R(n)\text{after})$$

$$\text{move}G(n) = \text{Coe}(n) \times (G(n)\text{before} - G(n)\text{after})$$

$$\text{move}B(n) = \text{Coe}(n) \times (B(n)\text{before} - B(n)\text{after}) \qquad \text{(Expression 4)}$$

In this expression, "moveR(n)•moveG(n)•moveB(n)" represents the movement distance of the devRGB value of an extracted lattice point (n represents a value for identifying an extracted lattice point), "R(n)before•G(n)before•B(n)before" represents the devRGB value of the lattice point before a change caused by deletion, and "R(n)after•G(n)after•B(n)after" represents the devRGB value of the lattice point after the changed caused by deletion. The total movement distance is calculated using expression 5.

$$\text{Total\_move}R = \Sigma\text{move}R(n)$$

$$\text{Total\_move}G = \Sigma\text{move}G(n)$$

$$\text{Total\_move}B = \Sigma\text{move}B(n) \qquad \text{(Expression 5)}$$

In this expression, "Total_moveR•Total_moveG•Total_moveB" represents the devRGB value of the total movement distance.

In step S1004, the CPU 202 calculates the amount of correction by dividing the total movement distance by the number of lattice points that do not show a change after deletion. The lattice point that does not show a change after deletion is a lattice point that does not overlap with lattice points used to express the selected adjustment color. More specifically, the lattice point that does not show a change after deletion is a lattice point having the moveR(n)•moveG(n)•moveB(n) of 0 calculated in step S1003. The amount of correction is calculated by counting the number of lattice points having the moveR(n)•moveG(n)•moveB(n) of 0 and dividing the movement distance by the calculated number using expression 6.

$$\text{CorrectValue}R = \text{Total\_move}R/\text{countGrid}$$

$$\text{CorrectValue}G = \text{Total\_move}G/\text{countGrid}$$

$$\text{CorrectValue}B = \text{Total\_move}B/\text{countGrid} \qquad \text{(Expression 6)}$$

In this expression, "CorrectValueR•CorrectValueG•CorrectValueB" represents the total movement distance of a devRGB value and "countGrid" represents the number of lattice points having the moveR(n)•moveG(n)•moveB(n) of 0.

In step S1005, the CPU 202 calculates the amount of adjustment. The amount of adjustment is calculated by incorporating the degree of influence of each lattice point into the amount of correction calculated in step S1004 using expression 7.

$$\text{GridAdjust}R(n) = (1/\text{Coe}(n)) \times \text{CorrectValue}R$$

$$\text{GridAdjust}G(n) = (1/\text{Coe}(n)) \times \text{CorrectValue}G$$

$$\text{GridAdjust}B(n) = (1/\text{Coe}(n)) \times \text{CorrectValue}B \qquad \text{(Expression 7)}$$

In this expression, "GridAdjustR(n)•GridAdjustG(n)•GridAdjustB(n)" represents the amount of adjustment of a devRGB value (n represents a value for identifying an extracted lattice point).

The calculation of the amount of adjustment is performed upon only a lattice point having the moveR(n)•moveG(n)•moveB(n) of 0. The amount of adjustment is added to the devRGB value of only the lattice point having the moveR(n)•moveG(n•moveB(n) of 0. Thus, the readjustment process is performed.

By performing the above-described process, it is possible to, in a case where the adjustment result of a certain color is changed (deleted) after a plurality of colors have been sequentially adjusted, maintain the adjustment results of the colors to prevent the adjustment result of the color adjusted after the adjustment of the certain color from being changed under the influence of the deletion of the certain color.

More specifically, in a case where colors 1, 2, and 3 are sequentially adjusted in this order and then the adjustment result of the color 2 is deleted, it is possible to maintain the adjustment result of the color 3 before/after the deletion of the adjustment result of the color 2 by readjusting the adjustment result (a corresponding color conversion table) of the color 3.

Thus, even if a color similar to a target color whose adjustment result is desired to be canceled is present in stored histories of a plurality of color adjustments, the adjustment result of the target color can be canceled without changing the similar color. That is, even if one of the adjustment results stored as adjustment histories is changed to an original color, the other adjusted colors are prevented from being changed. The occurrence of an unexpected color change for a user can be prevented.

All of pieces of processing according to this embodiment may be performed by only the printer controller 104.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)®), a flash memory device, a memory card, and the like.

While the present invention has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2016-064702 filed Mar. 28, 2016, which is hereby incorporated by reference herein in its entirety.

What is claimed is:

1. An image processing apparatus comprising:
    a first adjustment unit configured to adjust a color conversion table, used for converting a color to be printed by a printer, by adjusting a selected adjustment color using the selected adjustment color and a target color;
    a storage unit configured to store, in a storage apparatus, a first color conversion table and a second color conversion table, the first color conversion table generated by causing the first adjustment unit to adjust the color conversion table for a first adjustment color, and the second color conversion table generated by the first adjustment unit to adjust a second adjustment color different from the first adjustment color after generation of the first color conversion table;
    a cancellation unit configured to delete an adjustment result of the first adjustment color; and
    a second adjustment unit configured to adjust the second color conversion table stored in the storage apparatus by the storage unit in response to the deletion of the adjustment result of the first adjustment color which has been performed by the cancellation unit.

2. The image processing apparatus according to claim 1, wherein at least one of lattice points that are included in the first color conversion table and used to express the first adjustment color is the same as at least one of lattice points that are included in the second color conversion table and used to express the second adjustment color.

3. The image processing apparatus according to claim 1, wherein, in a case where the cancellation unit deletes the first color conversion table as the adjustment result of the first adjustment color, the second adjustment unit changes a value corresponding to a lattice point that is included in the second color conversion table and used to express the second adjustment color.

4. The image processing apparatus according to claim 1, further comprising a determination unit configured to determine whether the second adjustment color stored by the storage unit is affected by the deletion of the first color conversion table which has been performed by the cancellation unit as the deletion of the adjustment result of the first adjustment color, and
    wherein, in a case where the determination unit determines that the second adjustment color is affected, the second adjustment unit performs an adjustment.

5. The image processing apparatus according to claim 4, wherein the determination unit determines that the second adjustment color is affected in a case where a lattice point that is included in the first color conversion table and used to express the first adjustment color is the same as at least one of lattice points that are included in the second color conversion table and used to express the second adjustment color.

6. The image processing apparatus according to claim 1, wherein the second adjustment unit calculates an adjustment amount that is the amount of adjustment performed upon a lattice point included in the first color conversion table when the first adjustment unit generates the first color conversion table by adjusting the color conversion table, and adjusts a value of a lattice point included in the second color conversion table based on the adjustment amount.

7. The image processing apparatus according to claim 6, wherein the calculated adjustment amount is used to adjust values of a plurality of lattice points that are included in the second color conversion table and used to express the second adjustment color.

8. The image processing apparatus according to claim 6, wherein the calculated adjustment amount is used to adjust values of a plurality of lattice points that are included in the second color conversion table and used to express the second adjustment color, and
    wherein the adjustment amount is determined based on a difference between a color value of each lattice point used to express the second adjustment color and a color value of the second adjustment color.

9. An image processing method comprising:
    adjusting a color conversion table, used for converting a color to be printed by a printer, by adjusting a selected adjustment color using the selected adjustment color and a target color;
    storing, in a storage apparatus, a first color conversion table and a second color conversion table, the first color conversion table generated by adjusting the color conversion table for a first adjustment color, and the second color conversion table generated to adjust a second adjustment color different from the first adjustment color after generation of the first color conversion table;
    deleting an adjustment result of the first adjustment color; and
    adjusting the second color conversion table stored in the storage apparatus in response to the deletion of the adjustment result of the first adjustment color.

10. A non-transitory computer readable storage medium storing a program that when executed by a computer causes the computer to perform an image processing method, the image forming method comprising:
    adjusting a color conversion table, used for converting a color to be printed by a printer, by adjusting a selected adjustment color using the selected adjustment color and a target color;
    storing, in a storage apparatus, a first color conversion table and a second color conversion table, the first color conversion table generated by adjusting the color conversion table for a first adjustment color, and the second color conversion table generated to adjust a second adjustment color different from the first adjustment color after generation of the first color conversion table;
    deleting an adjustment result of the first adjustment color; and
    adjusting the second color conversion table stored in the storage apparatus in response to the deletion of the adjustment result of the first adjustment color.

* * * * *